United States Patent [19]
Ueno

[11] Patent Number: 5,704,753
[45] Date of Patent: Jan. 6, 1998

[54] EASILY ATTACHABLE AND DETACHABLE CONNECTOR DEVICE

[75] Inventor: Eiji Ueno, Utsunomiya, Japan

[73] Assignee: Nifco Inc., Yokohama, Japan

[21] Appl. No.: 723,528

[22] Filed: Sep. 30, 1996

[30] Foreign Application Priority Data

Jan. 8, 1996 [JP] Japan ................... 8-018118

[51] Int. Cl.⁶ ..................... F16B 19/00; F16B 13/04
[52] U.S. Cl. ................ 411/509; 411/908; 411/913; 24/297
[58] Field of Search ........................ 411/508, 509, 411/510, 908, 913; 24/297, 453

[56] References Cited

U.S. PATENT DOCUMENTS

| | | |
|---|---|---|
| 4,987,656 | 1/1991 | Sato ........................ 411/508 X |
| 5,173,026 | 12/1992 | Cordola et al. ............. 24/297 X |
| 5,319,839 | 6/1994 | Shimajiri .................. 24/297 X |
| 5,573,362 | 11/1996 | Asami et al. ............... 411/509 |

*Primary Examiner*—Neill R. Wilson
*Attorney, Agent, or Firm*—Kanesaka & Takeuchi

[57] ABSTRACT

A connecting device of the invention is used to connect two members together. The connecting device is formed of a base flange, a support column extending downwardly from the base flange, and elastically deformable engaging members formed at both lateral sides of the support column and projecting from the base flange. The support column has first and second side edges, and the lateral sides extending between the first and second side edges. The distance between the first and second side edges is greater than that between the lateral sides. The first side edge is cut diagonally from a longitudinal middle portion of the support column to a lower end portion of the support column, and the second side edge is cut diagonally from near a top of the support column to the lower end portion. The engaging members have lower ends terminating at and joining with the lower end portion. Each engaging member has a circular arc shape in a lateral cross section and extends from near the first side edge to cover a middle of the width at one lateral side, and an enlarged portion extending laterally outwardly from the support column at the longitudinal middle portion of the support column. The connecting device can be used repeatedly for connecting the two members together.

9 Claims, 10 Drawing Sheets

EASILY ATTACHABLE AND DETACHABLE CONNECTOR DEVICE

BACKGROUND OF THE INVENTION AND RELATED ART STATEMENT

The present invention relates to a connecting device for connecting one plate with the other plate, which is formed of a support column in a plate or rectangular shape formed at a lower surface of a base flange, and elastically deformable engaging members are attached to both sides of the support column. Each engaging member is enlarged or protruded outwardly in a middle portion in an axial or longitudinal direction of the support column. An upper side of the base flange is fixed to one plate, and the support column and the engaging members are forcibly inserted into a circular connecting hole formed in the other plate, so that the one and the other plates are connected together. In particular, the connecting device is improved in durability when it is used repeatedly, and the insertion force and removing force are reduced when it is fixed and removed, so that working ability is improved.

Conventionally, as a connecting device for connecting two plates together, a connecting device disclosed in Japanese Patent Publication (KOKAI) No. 3-113108 has been known. As shown in FIGS. 13(A)–13(D), a support column d in a plate or rectangular shape is formed to project from a lower surface of a circular shape base flange a, on which a connecting flange c is attached through a neck b, and elastically deformable engaging members e are attached to both sides of the support column d. Each engaging member e is integrally formed to project from the lower surface of the base flange a, and tips or lower ends of the engaging members e are integrally joined with the lower end of the support column d. The engaging member e has a circular arc shape in a lateral cross section, and a middle portion in a longitudinal or axial direction of the support column, which is enlarged laterally. In the drawings, f is an elastically deformable flange for preventing wobbling of the connecting device, and g is a depression formed in the neck b and opened at an upper portion of the connecting flange c for reducing a material of the connecting device.

Figure 13A:
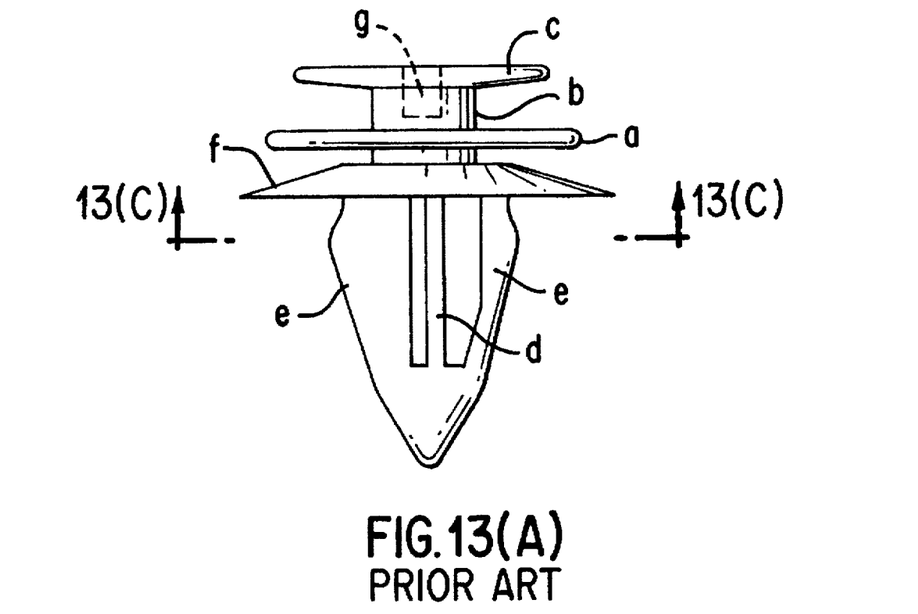
FIG. 13(A) is a front view of a conventional connecting device.
Figure 13B:
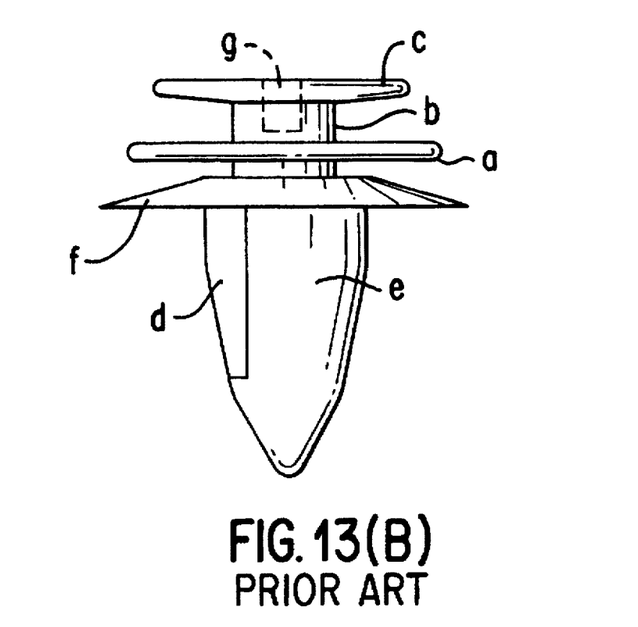
FIG. 13(B) is a side view of a conventional connecting device.
Figure 13C:
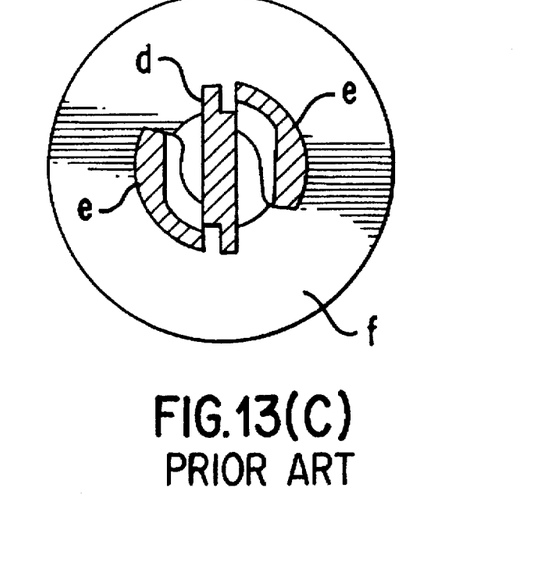
FIG. 13(C) is a sectional view taken along line 13(C)—13(C) in FIG. 13(A)
Figure 13D:
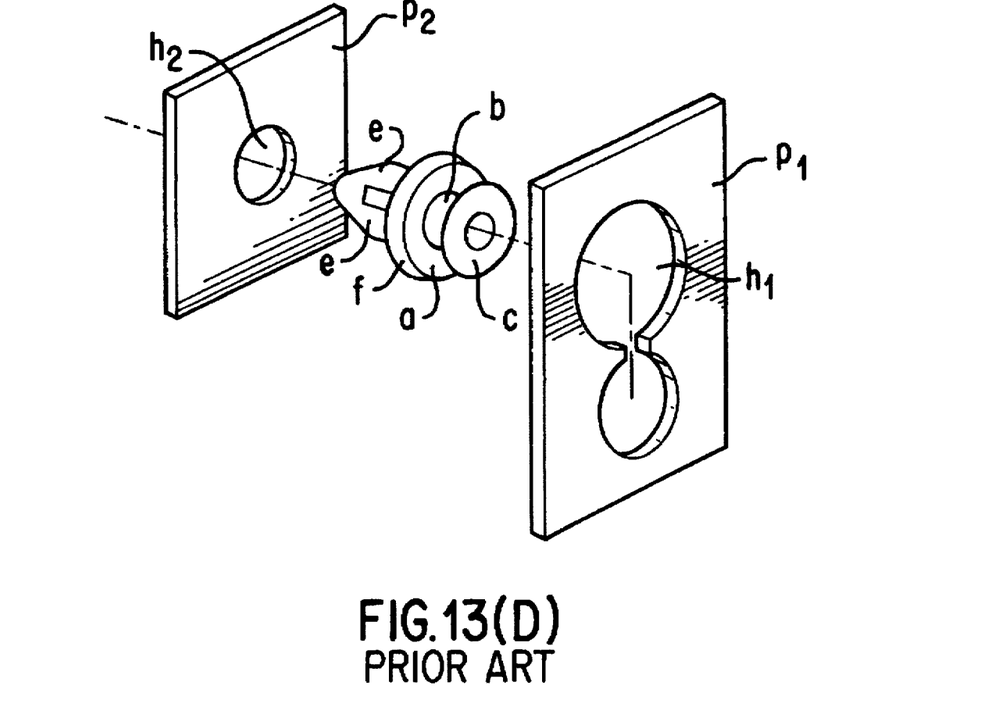
FIG. 13(D) is a perspective view for explaining a method of connecting two plates by the conventional connecting device.

As shown in FIG. 13(D), the connecting device is fixed by inserting the connecting flange c and the neck b into a hole $h_1$ formed of two circular openings and disposed in one plate $P_1$, and also inserting the support column d and the engaging members e into a round engaging hole $h_2$ formed in the other plate $P_2$. An area around the engaging hole $h_2$ is held between the enlarged portions of the engaging members e and the flange f for preventing wobbling formed at the lower side of the base flange a. Thus, the plates $P_1$ and $P_2$ are connected together.

However, as shown in FIG. 13(C), the engaging members e are formed separately around the support column d to respectively cover areas from the different side edges of the support column d to the middle portions of the support column d in the width direction. Thus, the engaging members e can abut against the inner surface of the engaging hole $h_2$ substantially equally. In this case, if the projecting distances (enlarged amount) or elasticity of the engaging members e are increased to form good fixing force, a force required to forcibly insert the connecting device into the engaging hole $h_2$ becomes large to decrease the working ability. On the other hand, if the projecting distances or elasticity of the engaging members e are reduced with reference to the working ability, a sufficient fixing force is not obtained.

In the past few years, in case two plates are connected to and disconnected from each other, the connecting devices are recovered and used again. In this case, if the projecting distances (enlarged amount) or elasticity of the engaging members e are increased, the working ability for forcibly inserting and removing the connecting device decreases. Also, the enlarged portions of the engaging members e are ground at the edge of the engaging hole $h_2$ by repeated insertion and removal of the connecting device, so that the initial ability or effect of the connecting device may not be obtained.

Further, in case the connecting devices are integrally formed of plastic by an injection molding, the plastic at the neck b with large thickness contracts significantly, so that molding defect, such as depression at the upper center portion of the connecting flange c, is liable to occur. In this connecting device, the depression g is formed in the neck b to face upwardly from the connecting flange c to form the thickness of the neck b as in the other portions, so that molding defect due to contraction of the plastic is avoided. However, a mold having a thickness reducing pin for forming the depression g has to be formed separately from a mold for forming a main portion of the connecting device in view of the mold disassembling or separating direction. Thus, it requires a complicated molding steps by using a three-phase or three-separation mold, which causes an increase of the cost of the connecting device.

The present invention has been made in view of the above circumstances.

An object of the invention is to provide a connecting device for connecting two plates, which can surely provide good fixing force, and good working ability in fixing and removal of the connecting device.

Another object of the invention is to provide a connecting device as stated above, wherein the ability of the connecting device is not degraded even if the connecting device is fixed and removed repeatedly.

A further object of the invention is to provide a connecting device as stated above, which can be easily manufactured by two-phase or two-separation mold.

Further objects and advantages of the invention will be apparent from the following description of the invention.

SUMMARY OF THE INVENTION

In order to attain the above objects, in a connecting device of the invention, a support column in a plate shape is formed at a lower side of a base flange to project outwardly therefrom, and elastically deformable engaging members are formed at both sides of the support column and project from the lower surface of the base flange. Tips or lower ends of the engaging members are joined together with a tip or lower end portion of the support column, and each engaging member has a circular arc shape in a lateral cross section. A middle portion of the engaging member in the axial or longitudinal direction of the support column is projected or enlarged laterally outwardly. One plate is fixed to an upper side of the base flange, and the support column and the engaging members are forcibly inserted into a circular connecting hole formed in the other plate so that a peripheral area of the connecting hole is held between the enlarged portions of the engaging members and a lower surface of the base flange. Thus, the one and the other plates are connected together.

In the invention, the width of a base end of the support column adjacent to the base flange is identical to the inner diameter of the connecting hole. One side edge of the support column is cut diagonally from the middle portion to the lower end portion thereof, and the other side edge of the support column is cut diagonally from near the base end to the lower end portion. Each of the engaging members disposed on each side of the support column is formed to cover from near the one side edge of the support column to a middle of the support column in the width direction.

In accordance with the connecting device of the invention, even if the projecting distances (enlarged amount) or elasticity of the engaging members are relatively increased in view of the fixing force to the engaging hole formed at the other plate, insertion and removal of the connecting device can be performed with good working ability without increasing the insertion force to the engaging hole and the removal force from the engaging hole. Further, it is possible to establish a good fixing force.

Namely, in case the connecting device of the invention is fixed to the engaging hole formed in the other plate, the support column and the engaging members are forcibly inserted into the engaging hole. The engaging members pass through the engaging hole by elastically deforming the engaging members inwardly, and then the engaging members are elastically recovered. As a result, the periphery of the engaging hole is held between the enlarged portions of the engaging members and the base flange. In this case, in the connecting device of the invention, since each of the engaging members is formed to cover from the one side edge of the support column to a middle of the support column in the width direction, the counter forces of the engaging members generated when the engaging members are elastically deformed inwardly appear biasedly at the one side edge of the support column and act on the support column in the engaging hole to move in a direction to the other side edge. In this case, since the other side edge of the support column is cut diagonally from near the base end to the lower end, the support column and the engaging members are moved in the engaging hole to the other side edge. Accordingly, the counter forces of the engaging members are absorbed, and the engaging members and the support column can be easily inserted into the engaging hole.

Further, since the length of the base end of the support column is formed to be identical with the inner diameter of the engaging hole, in case the engaging members and the support column are entirely inserted into the engaging hole and the engaging members are elastically restored, the engaging device of the invention is held in a predetermined position in the engaging hole while aligning the centers of the support column and the engaging hole together. Both engaging members effectively act on the periphery of the engaging hole to firmly fix the engaging device. Also, the connecting device operates in the same way when the engaging members and the support column are removed from the engaging hole.

Accordingly, in the invention, the engaging device can be inserted and removed in good working ability. Also, it is possible to obtain a good fixing force.

Further, when the support column and the engaging members are inserted into or removed from the engaging hole, the support column and the engaging members are moved to the other side edge of the support column to thereby absorb counter forces formed at the engaging members. Therefore, it is surely prevented that when the connecting device is removed, the surfaces of the enlarged portions of the engaging members and the side edges of the support column are pushed on the inner edge of the engaging hole and are ground. Even if the connecting device is inserted and removed repeatedly, the fixing ability is not lowered. Thus, the connecting device can be reused properly.

In the connecting device of the invention, as means for fixing one plate on the upper side of the base flange, a fixing flange is formed through a neck on the upper side of the base flange. The fixing flange and the neck are inserted into a hole formed of two circles located in the one plate, so that the connecting device is fixed to the one plate. In this case, in order to prevent formation of the injection defect due to resin contraction, preferably, a depression or a through hole extending along the radial direction of the neck is formed to form the thickness of the neck as in the other portions. As a result, formation of the injection defect due to the resin contraction is surely prevented, and it is possible to easily form the connecting device by a two-phase or two-separation mold.

As stated above, the depression or through hole formed in the neck is arranged along the radial direction of the neck, so that a thickness reducing pin for forming the depression or the through hole may be formed in one side of the two-separation mold separating in the radial direction of the connecting device. It is not required to form a third portion of a mold, which is required in a case where a thickness reducing depression is formed along the axial direction of the neck, as in the conventional connecting device. The connecting device of the invention can be easily formed by the two-separation mold.

Also, in the connecting device, a wobbling prevention flange, which is elastically deformable, may be formed under the base flange to cover the support column and the engaging members, similar to the conventional connecting device. Thus, when the support column and the engaging members are forcibly inserted into the engaging hole formed in the other plate and are fixed there at, the wobbling prevention flange abuts against the other plate in the condition that the wobbling prevention flange elastically deforms to prevent wobbling between the connecting device and the plate.

Further, in the connecting device of the invention, a side edge of the engaging member located near the other side edge and at the axial middle portion, which becomes the largest portion in the enlarged portion of the engaging member, may be partly projected in the width direction to thereby further partly enlarge the enlarged portion of the engaging member. As a result, it is possible to elongate a contact portion between the inner periphery of the engaging hole and the engaging member at the time of engagement to thereby stably fix the connecting device to the plate.

BRIEF DESCRIPTION OF THE DRAWINGS

FIGS. 10(A) and 10(B) are partially sectional side views for explaining the operation when the plates are connected by the connecting device, wherein FIG. 10(A) shows a condition at a time of completion of the connection, and FIG. 10(B) shows a condition at a time of forcible insertion of the connecting device;

FIGS. 11(A) and 11(B) are bottom views for explaining the operation when the plates are connected by the connecting device, wherein FIG. 11(A) shows a condition at a time of completion of the connection, and FIG. 11(B) shows a condition at a time of forcible insertion of the connecting device;

DETAILED DESCRIPTION OF PREFERRED EMBODIMENTS

FIGS. 1–11 show one embodiment of a connecting device of the invention. In the connecting device, a hole fixing portion 2 is formed on an upper side of a base flange 1 with a circular plate shape, and an engaging hole fixing portion 3 is formed on a lower side of the base flange 1.

In the fixing portion 2, a neck 4 which has a columnar shape with a short axial length is fixed on an upper central portion of the base flange 1, and a fixing flange 5 with a disc shape, which has a diameter smaller than that of the base flange 1, is integrally formed on an upper end of the neck 4. Also, in the neck 4, a depression 6 for reducing the thickness is formed along a radial direction of the neck 4, by which the thickness of the neck 4 is regulated to be substantially the same as in the other portions.

Also, the fixing portion 3 is formed of a support column 7 projecting from a lower center portion of the base flange 1, and engaging members 8 formed at both sides of the support column 7 and projecting downwardly from the lower portion of the base flange 1. The tips or lower ends of the engaging members 8 are joined integrally with the tip or lower end of the support column 7, and the engaging member 8 has a circular arc shape in lateral section.

Figure 1:
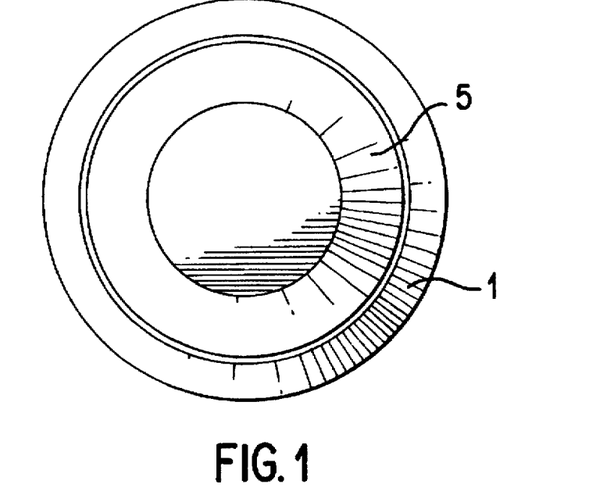
FIG. 1 is a plan view of one embodiment of a connecting device of the invention.
Figure 2:
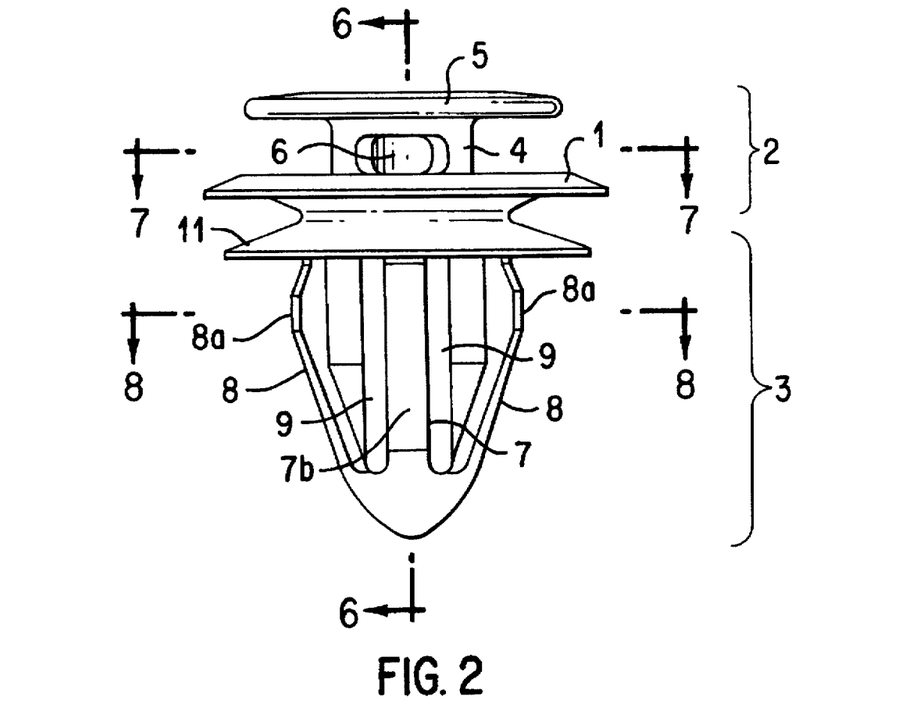
FIG. 2 is a front view of the connecting device.
Figure 4:
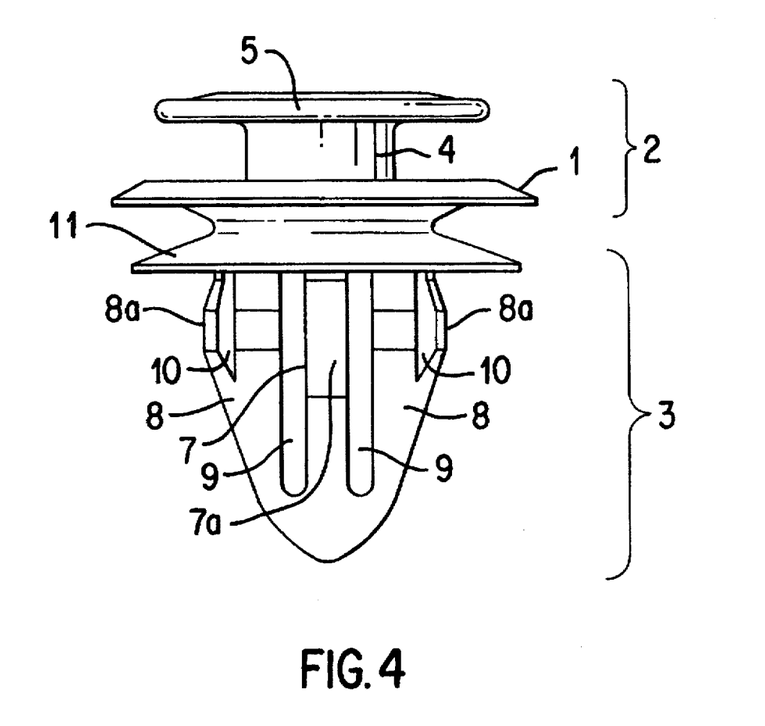
FIG. 4 is a rear view of the connecting device.
Figure 5:
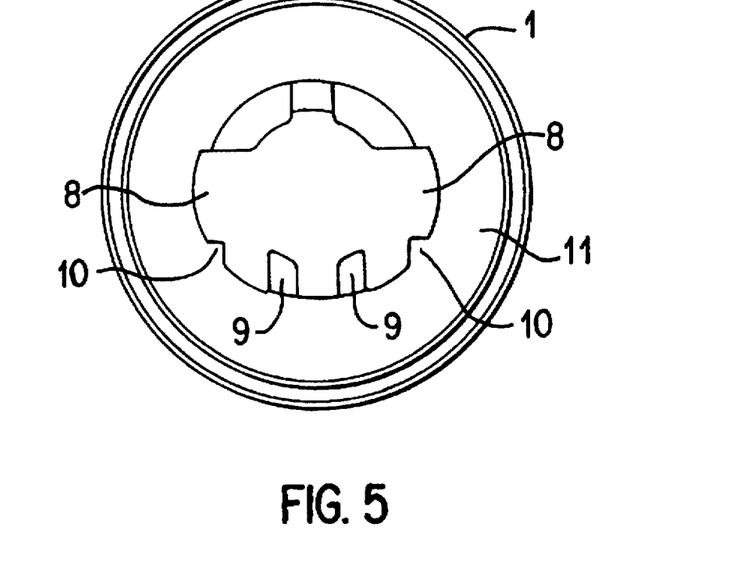
FIG. 5 is a bottom view of the connecting device.

As clearly shown in FIGS. 2 and 4, each of the engaging members 8 is projected or enlarged laterally outwardly at a portion slightly above a middle in the axial direction of the support column 7, and an enlarged portion 8a is gradually inclined inwardly toward the lower end. The fixing portion 3, as a whole, is laterally enlarged at the portion slightly above the middle of the support column 7 to have a largest diameter portion, and is gradually tapered toward the tip thereof.

Figure 8:
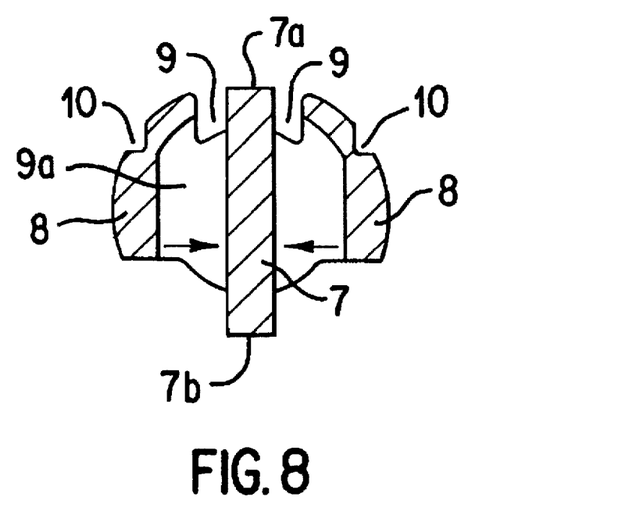
FIG. 8 is a sectional view of the connecting device taken along line 8—8 in FIG. 2.

There are hollow portions 9a between the engaging members 8 and the support column 7, so that when the engaging members 8 are pushed inwardly, the engaging members 8 can be elastically deformed inwardly. Also, as shown in FIG. 8, each of the engaging members 8 is formed to cover from near one side edge 7a of the support column 7 to a middle portion of the support column 7 in the width direction thereof. A thin slit 9 is formed between the one side edge 7a of the support column 7 and the engaging member 8, respectively, and at the other side edge 7b of the support column, the hollow portions 9a, each being formed between the support column 7 and the engaging member 8, are made relatively large and open outwardly. Also, a groove or cutout 10 extending from the base end to the enlarged portion 8a is formed on an outer surface of each engaging member 8 near the one side edge 7a to thereby partially form a thin wall portion. By the cutouts 10, as shown in FIG. 8, the engaging members 8 can elastically deform easily inwardly at the one side edge 7a (shown by arrows).

Figure 3:
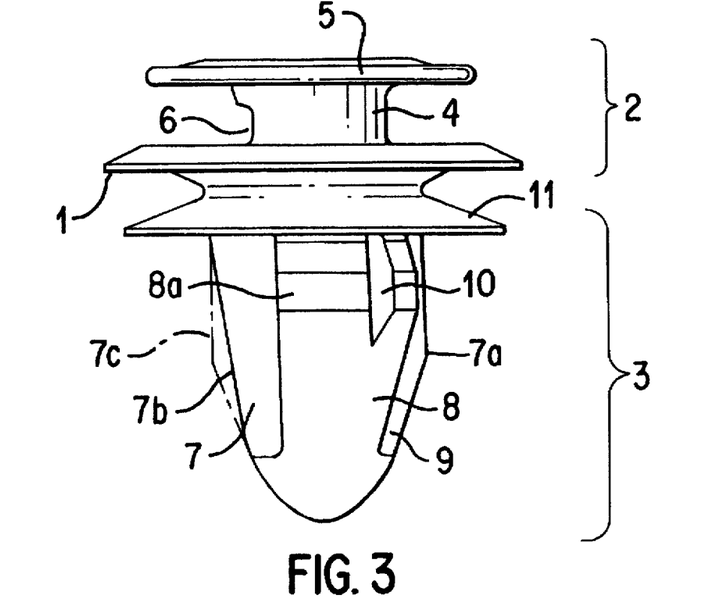
FIG. 3 is a side view of the connecting device.
Figure 6:
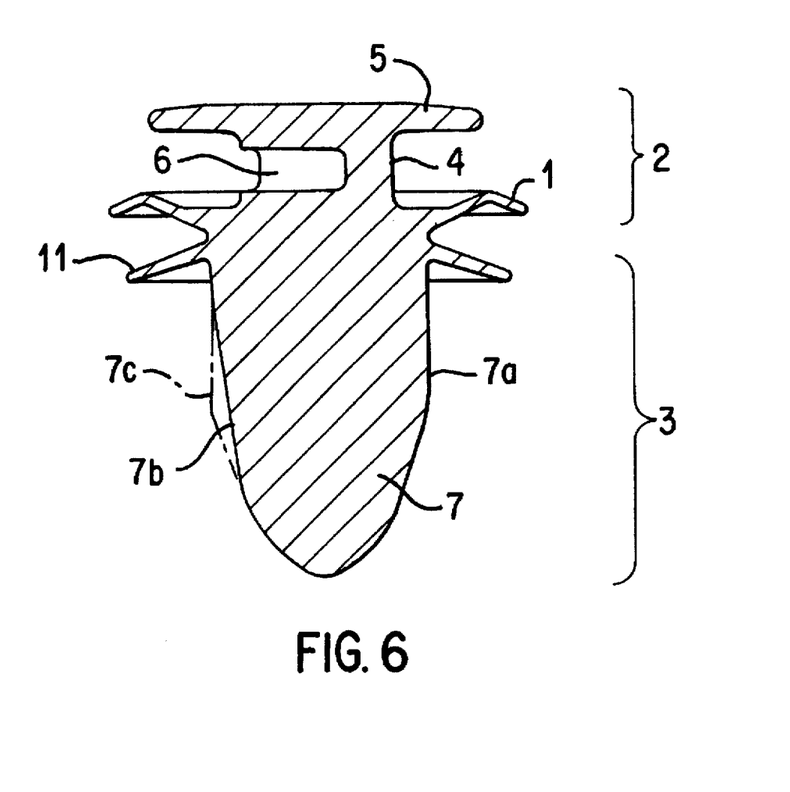
FIG. 6 is a sectional view of the connecting device taken along line 6—6 in FIG. 2.
Figure 7:
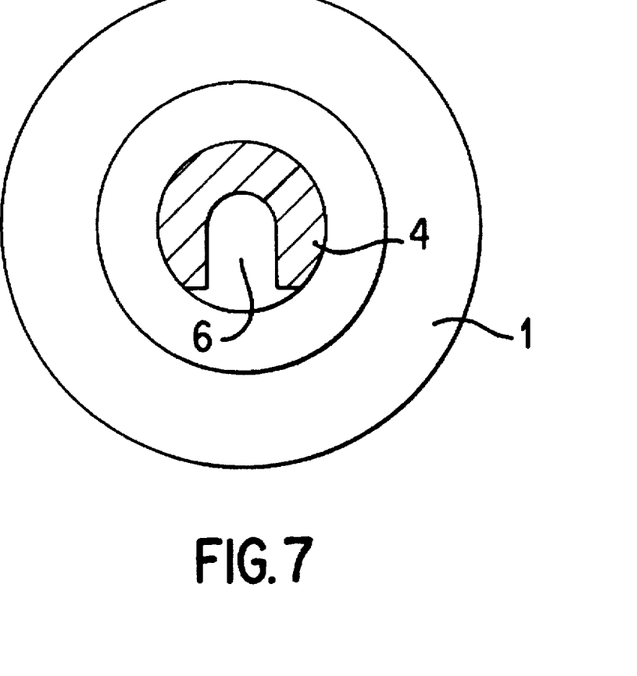
FIG. 7 is a sectional view of the connecting device taken along line 7—7 in FIG. 2.

Also, as shown in FIGS. 3 and 6, the width at the base end of the support column 7 is made identical to an inner diameter of an engaging hole $h_2$ (FIG. 9) for fixing the fixing portion 3. The one side edge 7a of the support column 7 is cut diagonally from the middle to the tip or the lower end thereof, and the other side edge 7b is cut diagonally from near the base end to the lower end, so that the both side edges have different shapes. Namely, one dot chain lines 7c in FIGS. 3 and 6 show a symmetrical shape relative to the one side edge 7a, and the other side edge 7b has a shape cut linearly and diagonally from near the base end to the lower end.

Incidentally, numeral 11 is a wobbling prevention flange, which is elastically deformable and is formed below the base flange 1 integrally with the support column 7 and the engaging members 8 to surround or cover the same. When the connecting device is fixed to the engaging hole $h_2$ by forcibly inserting the fixing portion 3 to the engaging hole $h_2$, the wobbling prevention flange 11 abuts against a plate $P_2$ having the engaging hole $h_2$ in the condition that the wobbling prevention flange 11 is elastically deformed, so that wobbling between the connecting device and the plate $P_2$ is prevented. As shown in FIG. 6, the base flange 1 has a shape slightly bent upwardly in a middle thereof and is elastically deformable. When the fixing portion 2 is fixed to a hole $h_1$ (FIG. 9) with two circular portions, the base flange 1 abuts against a plate $P_1$ having the hole $h_1$ in the condition that the base flange 1 is elastically deformed, so that wobbling or mis-alignment between the connecting device and the plate $P_1$ is prevented.

Figure 9:
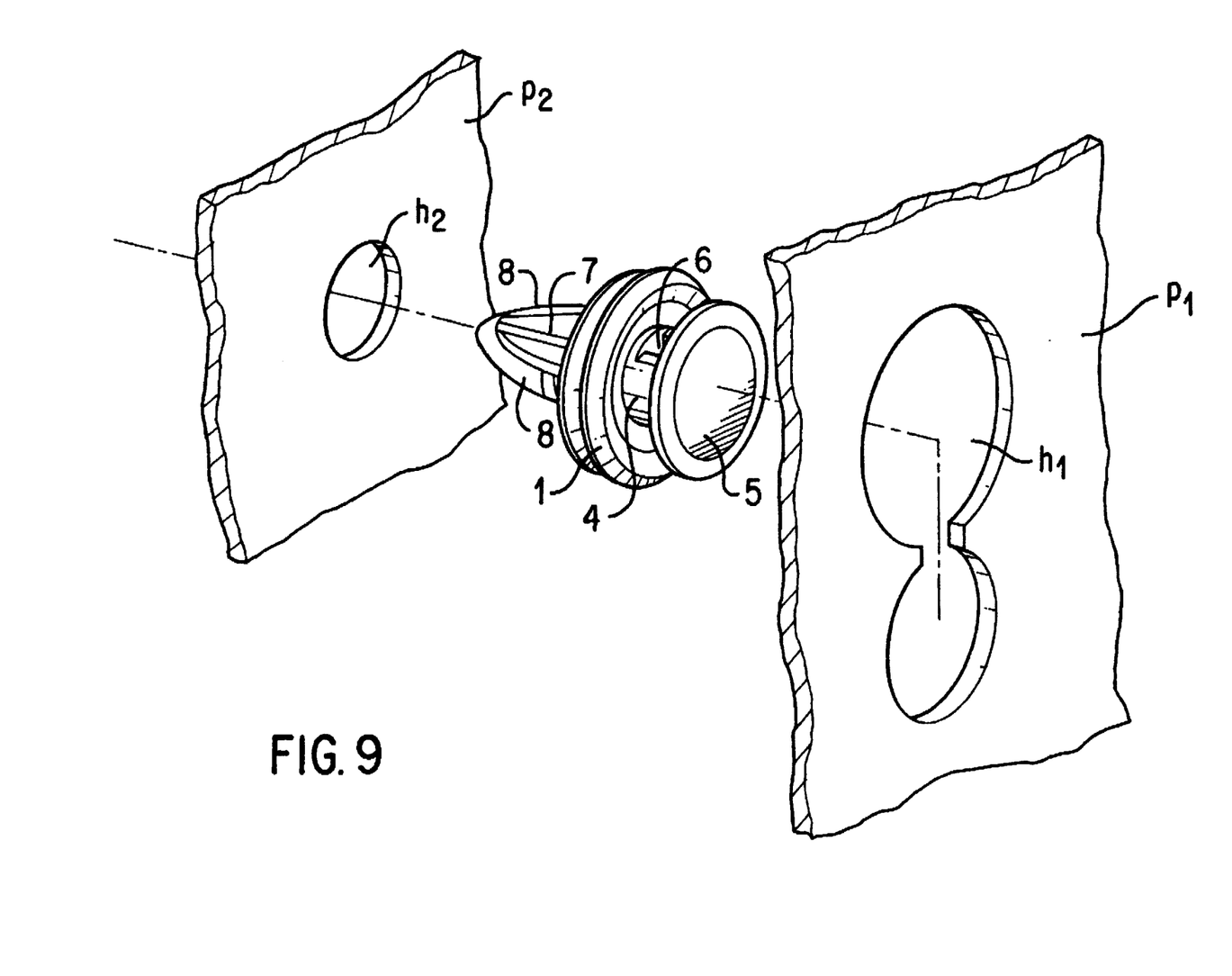
FIG. 9 is a perspective view for explaining a method of connecting two plates by the connecting device of the invention.

When the two plates are connected together by using the connecting device of the invention, as shown in FIG. 9, the neck 4 and the flange 5 are inserted into a large diameter portion of the hole $h_1$ and are moved to a small diameter portion of the hole $h_1$, so that the connecting device is fixed to the plate $P_1$. Also, the support column 7 and the engaging members 8 are forcibly inserted into the engaging hole $h_2$ to fix to the other plate $P_2$. As a result, the plates $P_1$, $P_2$ are connected together by the connecting device of the invention. In this case, as explained above, the base flange 1 abuts against the plate $P_1$ in the condition that the base flange 1 is elastically deformed to thereby prevent wobbling or misalignment between the connecting device and the plate $P_2$. Also, the wobbling prevention flange 11 abuts against the plate $P_2$ in the condition that the wobbling prevention flange 11 is elastically deformed to thereby prevent wobbling between the connecting device and the plate $P_2$. Therefore, the plates $P_1$, $P_2$ are surely connected and fixed together without wobbling.

In the connecting device of the invention, even if the widths or the sizes of the enlarged portions of the engaging members 8, or the counter elastic force of the engaging members 8 are relatively increased with reference to the fixing force of the connecting device to the hole $h_2$ of the plate $P_2$, it is possible to perform insertion and removal operations of the connecting device with good working ability without increasing the insertion force to and the removal force from the engaging hole $h_2$. Further, it is possible to obtain a good fixing force.

Namely, the function is explained with reference to FIGS. 10 and 11. In case the connecting device of the invention is fixed to the engaging hole $h_2$ of the plate $P_2$, the support column 7 and the engaging members 8 are forcibly inserted into the engaging hole $h_2$. As a result, the engaging members 8 are once elastically deformed inwardly to allow the enlarged portions 8a to pass through the engaging hole $h_2$, and then the engaging members 8 are recovered to the original shapes. As shown in FIGS. 10(A) and 11(A), the connecting device holds the periphery of the engaging hole $h_2$ between the enlarged portions 8a of the engaging members 8 and the flange 1 in the condition the wobbling prevention flange 11 is placed therebetween. In this case, since both engaging members 8 are formed to extend from the one side edge 7a to cover the middle portion of the support column 7 in the width direction thereof, the counter forces when the engaging members 8 are inwardly deformed appear biasedly at the one side edge 7a, as shown by arrows in FIG. 11(B), which act on the support column 7 in the engaging hole $h_2$ to move in the direction of the other side edge 7b.

Figure 10A:
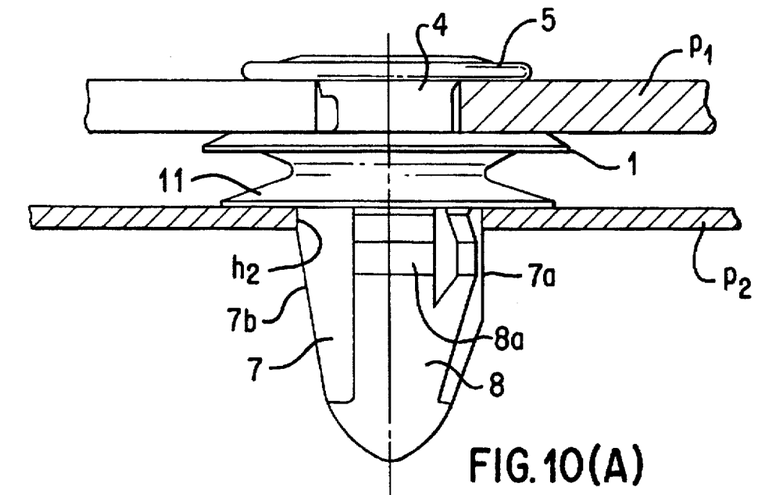
Figure 10B:
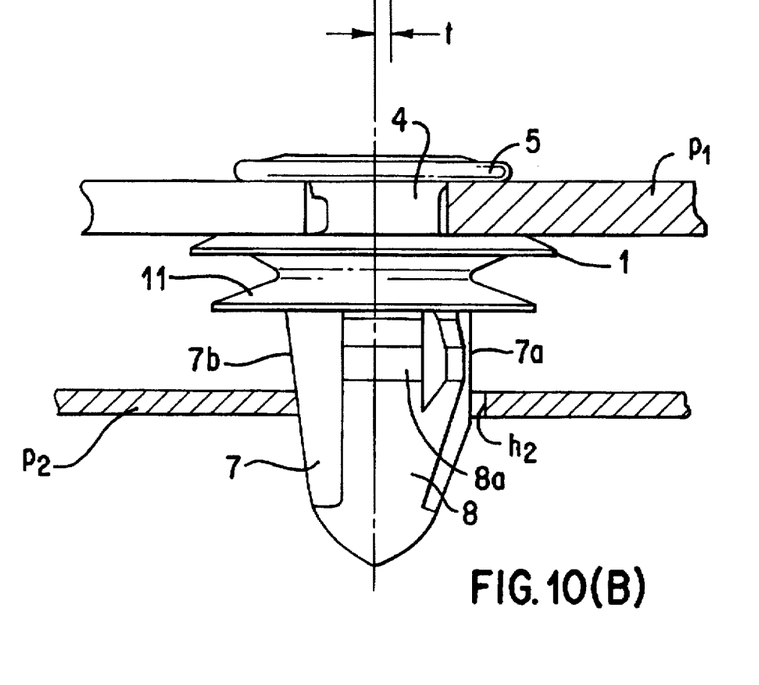
Figure 11A:
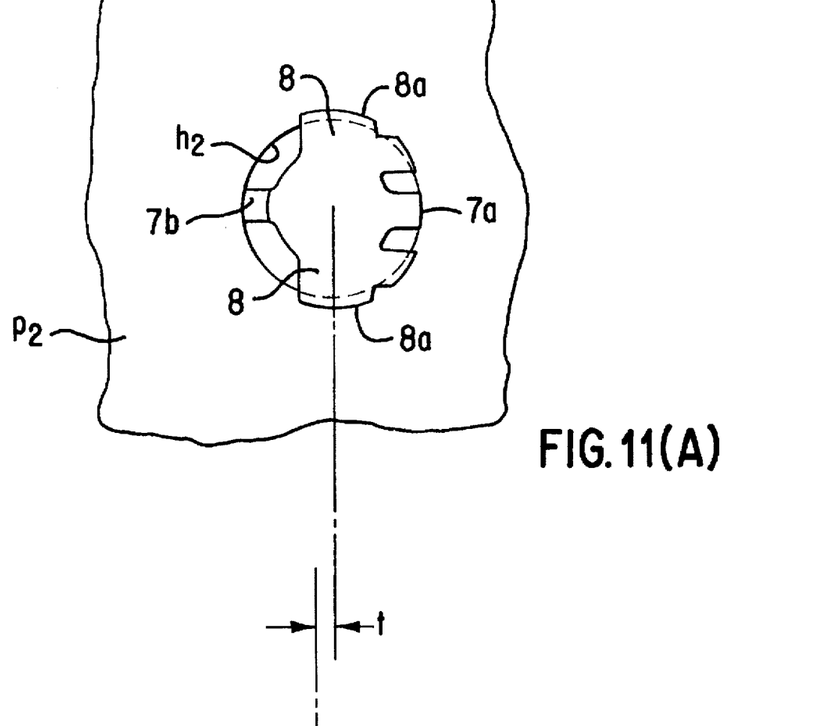
Figure 11B:
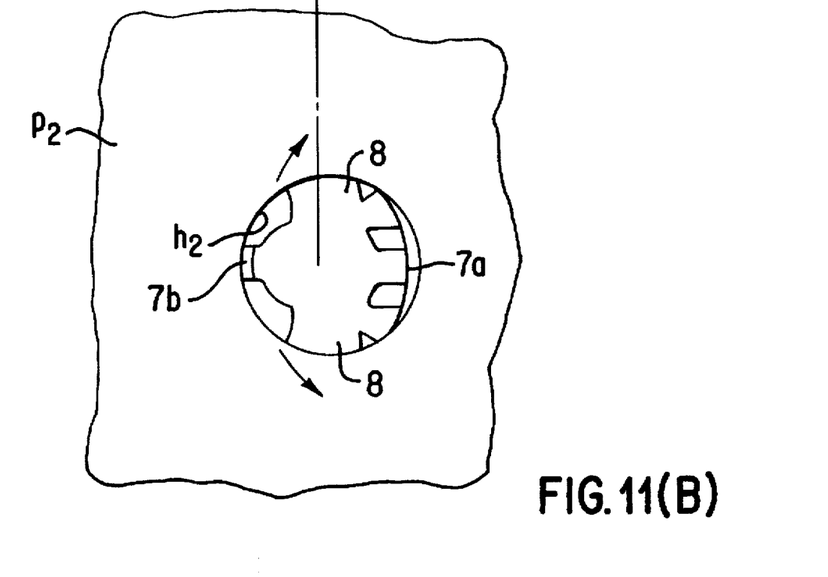

At this time, in the connecting device of the invention, since the other side edge 7b of the support column 7 is cut diagonally from a portion near the base end to the lower end, the support column 7 and the engaging members 8 move in the engaging hole $h_2$ toward the other side edge 7b (refer to t in FIGS. 10(A), 10(B), 11A(A), 11(B)). As a result, the counter force or bent force of the engaging members 8 is absorbed, so that the support column 7 and the engaging members 8 can be inserted easily to the engaging hole $h_2$. Since the base end of the support column 7 has a diameter as in the inner diameter of the engaging hole $h_2$ as explained before, the engaging members 8 and the support column 7 can be completely entered in the engaging hole h. In the condition that the shapes of the engaging members 8 resiliently return to the original shapes as shown in FIGS. 10(A) and 11(A), the connecting device of the invention is set on the predetermined position, wherein the center of the connecting device accords with the center of the engaging hole $h_2$. In this position, the engaging members 8 properly act on the periphery of the engaging hole $h_2$, so that the connecting device is securely fixed to the plate. When the support column 7 and the engaging members 8 are removed from the engaging hole $h_2$, the connecting device moves or operates reversely as explained above.

Accordingly, in the connecting device of the invention, the insertion and removal operations can be performed with good working ability. Moreover, a good fixing force can be obtained.

Further, as explained above, when the support column 7 and the engaging members 8 are inserted in or removed from the engaging hole $h_2$, the support column 7 and the engaging members 8 are moved toward the other edge 7b, so that the bending force or counter force of the engaging members 8 is absorbed. Therefore, it is surely prevented that when the connecting device is fixed or removed, the enlarged portions 8a of the engaging members 8 and the edges 7a, 7b of the support column 7 are urged strongly onto the edge of the engaging hole $h_2$ and are thus ground. Even if the insertion and removal are repeated, the effect of the connecting device is not degraded or reduced. Therefore, it is possible to reuse the connecting device.

Also, in the connecting device of the invention, in order to prevent formation of molding defect at the neck 4 due to resin contraction, the dent 6 is formed to extend in the radial direction of the neck 4 to have the thickness substantially the same as those in the other portions. Therefore, it is possible to effectively prevent formation of the molding defect due to resin contraction. Moreover, the molding can be made easily by a two-separation mold.

Namely, since the dent 6 in the neck 4 is formed to extend in the radial direction of the neck 4, as stated above, the thickness reducing pin for forming the dent 6 may be formed in one part of the two-separation mold dividing along the radial direction. In the invention, a third part of a mold is not required as in a case for forming a thickness reducing dent extending in an axial direction of the neck like a conventional connecting device. The connecting device of the invention can be easily formed by the two-phase or two-separation mold.

As explained above, in the connecting device of the invention, good fixing force can be surely obtained, and working ability for fixing or removing the device is excellent. Also, the quality of the connecting device is not degraded even if fixing and removing of the connecting device is repeated, and the connecting device can be formed easily by the two-separation mold.

Figure 12:
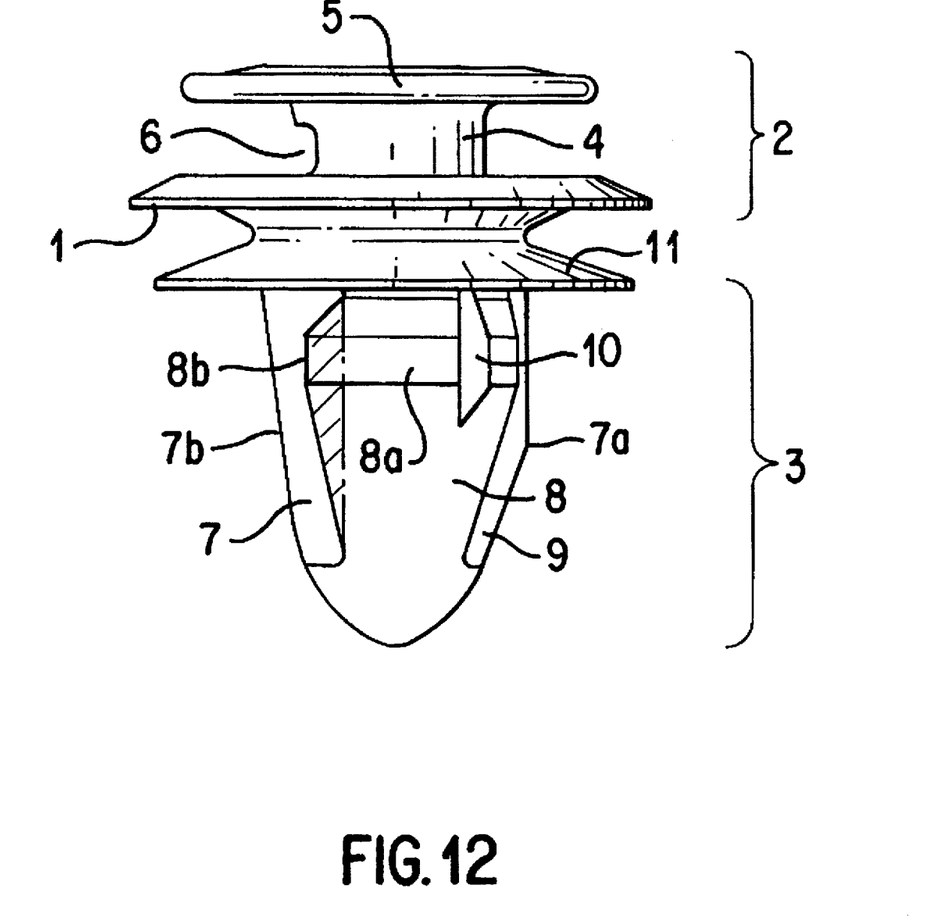
FIG. 12 is a side view of a different embodiment of the connecting device of the invention.

FIG. 12 shows the other embodiment of the connection device of the invention. In this connecting device, a side 8b, close to the edge 7b, of the enlarged portion 8a is expanded in the width direction. Since the side or expanding portion 8b shown in a diagonal hatching in FIG. 12 is formed, the contacting length between the inner periphery of the engaging hole $h_2$ and the engaging members at the time of fixing can be prolonged. Thus, the connecting device can be firmly and stably fixed to the engaging hole $h_2$. In this case, after the connecting device is molded, when the connecting device is taken out from the mold, the expanding portion 8b comes to an undercut or located partly behind a part of the mold. However, since the portion behind a part of the mold is only a small part of the enlarged portion 8a and is deformable, the connecting device can be taken out easily from the mold without trouble.

Since the structure and operation of the above embodiment are the same as in the embodiment shown in FIGS. 1–11, the identical numerals are assigned to the identical portions, and the explanation thereof is omitted.

Two embodiments of the invention have been explained herein before, but the invention need not be limited to the above embodiments. For example, the fixing portion formed on the upper side of the base flange may be changed in accordance with the plate to be fixed, and also, a through hole may be formed instead of the depression 6. Further, it is possible to eliminate the depression or wobbling prevention flange 11. Still further, the shape of the base flange and other structure may be changed without changing the scope of the invention.

As explained above, in the connecting device of the invention, good fixing force can be surely obtained, and the working ability at the time of fixing and removal is excellent. Also, the effect is not degraded even if the fixing and removal of the connecting device are repeated, so that the connecting device can be reused. Further, the connecting device can be formed easily by the two-separation mold.

What is claimed is:

1. A connecting device for connecting two members, comprising:
    a base flange having upper and lower sides,
    a support column extending downwardly from the lower side of the base flange, said support column having a base end situated adjacent to the base flange, a lower end portion situated opposite to the base end, first and second side edges situated away from each other between the base end and the lower end portion, and lateral sides extending between the first and second side edges, a distance between the first and second side edges being greater than that between the lateral sides, said first side edge being tapered substantially linearly from a longitudinal middle portion of the support column to the lower end portion and the second side edge being tapered substantially linearly from near the base end to the lower end portion so that the first and second side edges are asymmetrical relative to a central axis of the support column, and elastically deformable engaging members formed at said both lateral sides of the support column and projecting from the lower side of the base flange, said engaging members having lower ends terminating at and joining with the lower end portion of the support column, each engaging member having a circular arc shape in a lateral cross section perpendicular to a longitudinal direction of the support column extending from near the first side edge to cover a middle of one lateral side in a width direction, and an enlarged portion extending laterally outwardly from the support column at the longitudinal middle portion of the support column.

2. A connecting device according to claim 1, wherein the width of the base end of the support column is smaller than a size of the bare flange so that when the support column and the engaging members are forcibly inserted into a circular connecting hole formed in one of the two members, a peripheral area of the connecting hole is held between enlarged portions of the engaging members and a lower surface of the base flange.

3. A connecting device according to claim 2, wherein said enlarged portion of the engaging member located at the longitudinal middle portion becomes the largest in a lateral direction, and has a side near the second side edge, which is partly extended toward the second side edge to widen the enlarged portion.

4. A connecting device according to claim 3, further comprising a wobbling prevention flange situated at the lower side of the base flange, said wobbling prevention flange being made of an elastically deformable material and covering the support column and the engaging members.

5. A connecting device according to claim 1, further comprising an engaging flange at the upper side of the base flange, a neck situated between the engaging flange and the base flange to be inserted into a hole of a member to be connected, and thickness adjusting means formed in the neck and extending in a radial direction thereof to reduce the thickness of the neck.

6. A connecting device according to claim 5, wherein said thickness adjusting means is selected from a group consisting of a dent or a through hole, extending in a radial direction of the neck.

7. A connecting device according to claim 1, further comprising two spaces, each space being defined between one of the lateral sides of the support column and one of the engaging members facing thereto, and slits, each slit being formed between the support column and each of the engaging members and communicating with one of the spaces.

8. A connecting device according to claim 7, wherein each of said engaging members includes an elongated depression formed at an outer surface thereof and extending along the longitudinal direction to facilitate deformation of the engaging member.

9. A connecting device according to claim 1, wherein said first and second side edges have parallel portions at the base end, around which a connecting hole formed in one of the members is located when said one of the members is surely engaged with the support column, the central axis of the support column, when the support column is inserted into said connecting hole, being deviated from a center of the connecting hole until the parallel portions engage the connecting hole.

* * * * *